United States Patent
Eismann et al.

(10) Patent No.: US 8,424,890 B2
(45) Date of Patent: Apr. 23, 2013

(54) HOLLOW SHAFT CONNECTION DEVICE

(75) Inventors: Jens Eismann, Melle (DE); Manfred Buhl, Bissendorf (DE); Friedhelm Langhorst, Deipholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 236 days.

(21) Appl. No.: 13/120,960

(22) PCT Filed: Oct. 1, 2009

(86) PCT No.: PCT/DE2009/050053
§ 371 (c)(1),
(2), (4) Date: Mar. 25, 2011

(87) PCT Pub. No.: WO2010/037381
PCT Pub. Date: Apr. 8, 2010

(65) Prior Publication Data
US 2011/0254242 A1    Oct. 20, 2011

(30) Foreign Application Priority Data
Oct. 2, 2008   (DE) .......................... 10 2008 049 940

(51) Int. Cl.
*B60G 3/12*    (2006.01)
*B60G 11/20*   (2006.01)
*B60G 21/055*  (2006.01)

(52) U.S. Cl.
USPC ......... 280/124.107; 280/124.13; 280/124.153

(58) Field of Classification Search ........... 280/124.107, 280/124.106, 124.11, 124.111, 124.152, 280/280/124.153, 124.166, 124.128, 124.13, 280/679, 684
See application file for complete search history.

(56) References Cited

U.S. PATENT DOCUMENTS

| | | | |
|---|---|---|---|
| 4,451,245 A | | 5/1984 | Hornig et al. |
| 4,636,106 A | | 1/1987 | Waisbrod |
| 4,723,790 A | * | 2/1988 | Wharton ................... 280/124.13 |
| 4,921,231 A | * | 5/1990 | Reynolds et al. ............. 267/196 |

(Continued)

FOREIGN PATENT DOCUMENTS

| | | |
|---|---|---|
| DE | 874 534 | 4/1953 |
| DE | 30 07 896 A1 | 9/1981 |

(Continued)

*Primary Examiner* — Drew Brown
(74) *Attorney, Agent, or Firm* — Davis & Bujold, PLLC

(57) ABSTRACT

A connection device for the torque transmitting connection of a connection component (2) to a hollow shaft (1). The connection component (2) comprises a penetrating recess (8) corresponding in shape to the outside cross section of the hollow shaft (1) for receiving one end of the hollow shaft (1), and the hollow shaft comprises a press-fit plug (9) in the area of the connection to the connection component (2) that forms an interference fit with the inner cross section of the hollow shaft (1). Preferably, the connection device is a press-fit plug (9) additionally designed as a bearing seat (10, 11) for at least one bearing (13, 14) assigned to the hollow shaft. The connection device allows durable and reliable transmission of high torques and it is possible to connect further components to the connection between the hollow shaft and the connection component. The connection device allows a reduction in construction space, mass and costs.

16 Claims, 3 Drawing Sheets

U.S. PATENT DOCUMENTS

| | | | |
|---|---|---|---|
| 5,326,128 A * | 7/1994 | Cromley, Jr. | 280/656 |
| 6,447,073 B1 * | 9/2002 | Goettker | 301/127 |
| 6,945,548 B2 * | 9/2005 | Dudding et al. | 280/124.157 |
| 7,744,103 B2 | 6/2010 | Gercke et al. | |
| 7,967,308 B2 * | 6/2011 | Toepker | 280/124.106 |
| 8,191,911 B1 * | 6/2012 | Reynolds | 280/124.166 |
| 2002/0117816 A1 * | 8/2002 | Dudding et al. | 280/6.151 |
| 2006/0163834 A1 * | 7/2006 | Brereton et al. | 280/124.128 |

FOREIGN PATENT DOCUMENTS

| | | |
|---|---|---|
| DE | 43 42 809 A1 | 6/1994 |
| DE | 195 42 099 A1 | 5/1997 |
| DE | 197 18 307 A1 | 11/1998 |
| DE | 10 2005 056 878 A1 | 7/2007 |
| EP | 0 180 535 A1 | 5/1986 |
| EP | 2 065 233 A1 | 6/2009 |

* cited by examiner

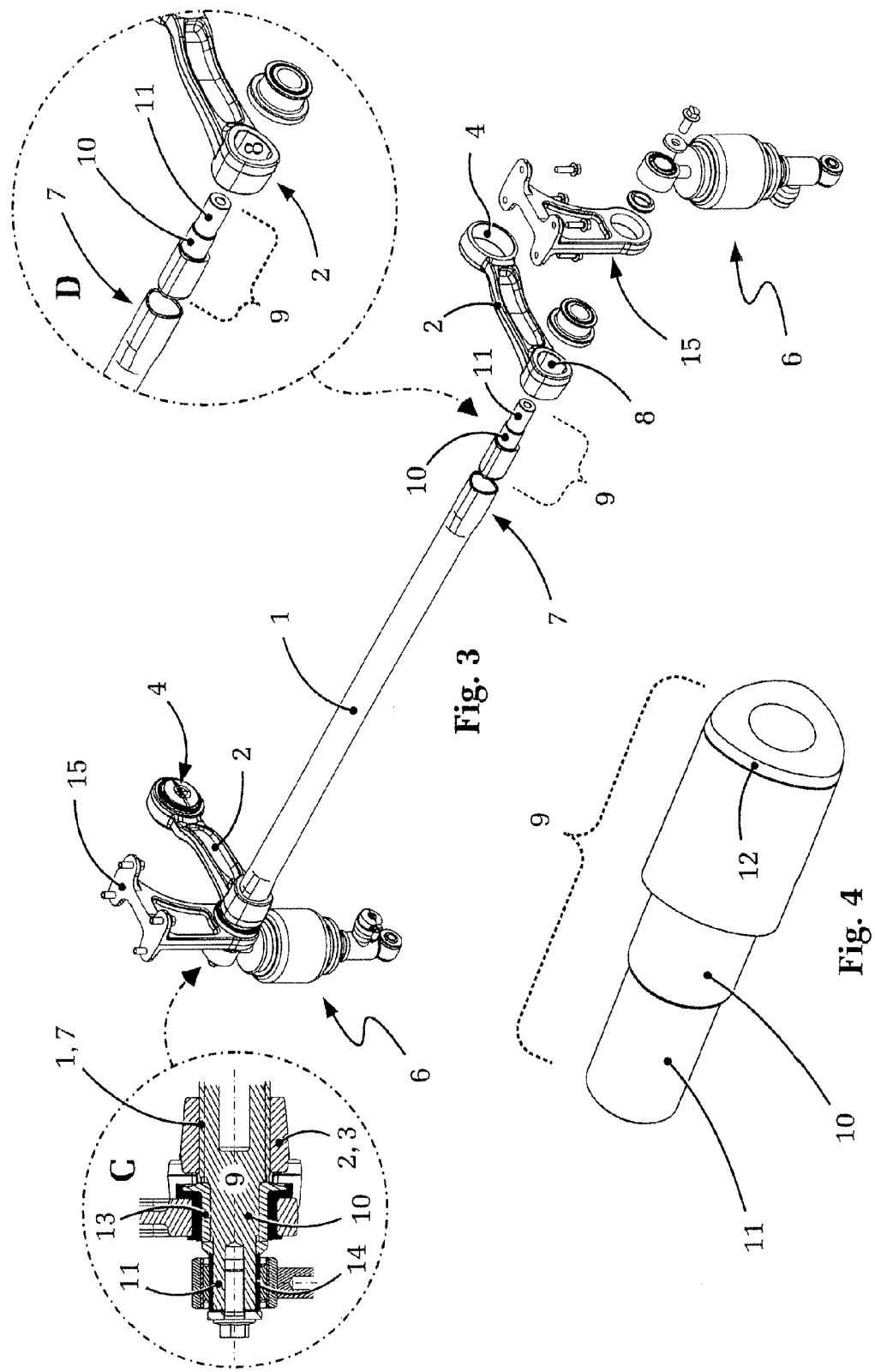

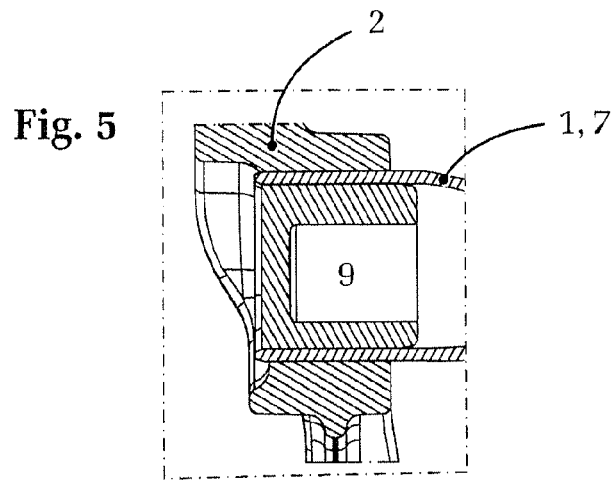
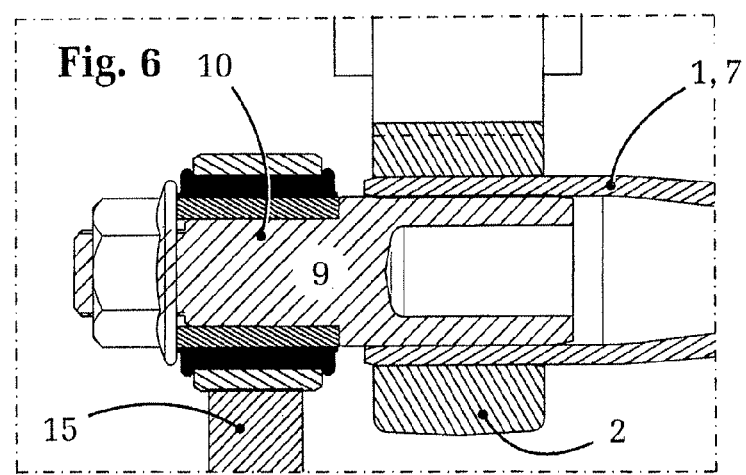
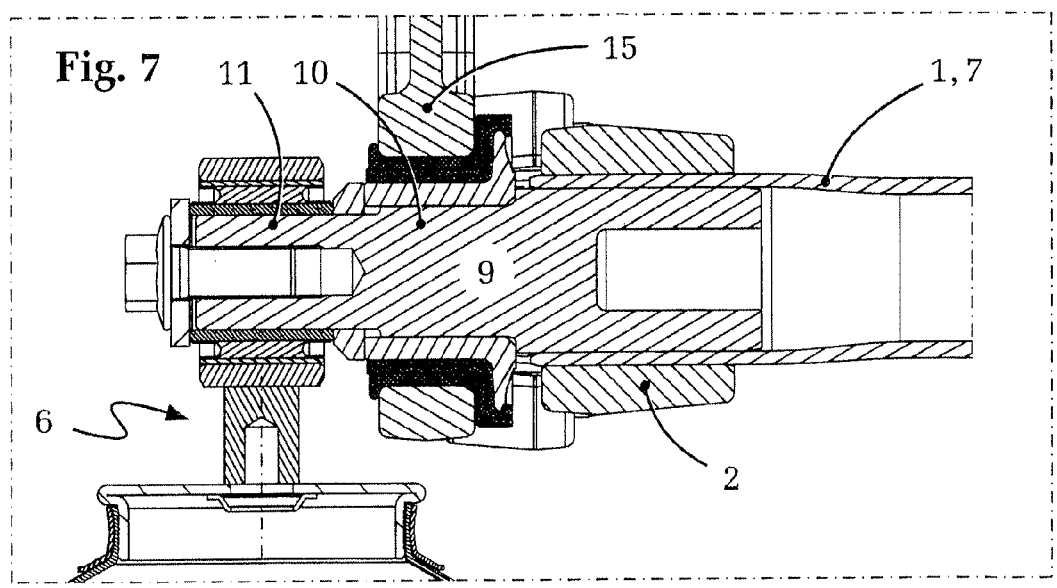

HOLLOW SHAFT CONNECTION DEVICE

This application is a National Stage completion of PCT/DE2009/050053 filed Oct. 1, 2009, which claims priority from German patent application serial no. 10 2008 049 940.4 filed Oct. 2, 2008.

FIELD OF THE INVENTION

The invention relates to a connection device for the torque transmitting coupling of a hollow shaft to a connection component.

BACKGROUND OF THE INVENTION

Connection devices, of the initially named type, are used for the connection of all types of torque transmitting components to associated shafts or hollow shafts. Conventional connections of this type are used, for example—but by no means exclusively—in the assembly of torque levers or control arms on torsion rods or stabilizer devices. One field of use, merely by way of example, is the area of shock and vibration absorbing suspension of motor vehicle driver's cabins, especially for trucks and similar heavy-duty trucks, in order to uncouple the driver's cabin with respect to vibrations and motions of the vehicle chassis in this manner.

Because the spring rates of the chassis springs in heavy-duty trucks are inevitably high, due to the heavy vehicle loads, unevennesses in the road surface or even vibrations and structure-borne noise, resulting from axles and the drive train, are still transmitted, to a considerable extent, to the chassis via the axle spring mounting. In order to minimize the transmission of such continuous shocks and vibrations to the driver's cabin, and thus to driver's workplace in terms of ergonomics and occupational safety, driver's cabin suspensions have been developed in which the driver's cab or cabin is supported by vehicle chassis using a separate suspension system.

Such suspension systems, for the driver's cabin, can be designed with lower spring rates and softer shock absorbers than the axle suspension due to the much lower weight of the driver's cabin in comparison to the weight of the vehicle, which is why unevennesses of the road surface or vibrations originating from the drive train or axles of the vehicle can therefore be isolated or kept away from the driver's workplace, to a significantly greater extent, due to such softer cabin suspension systems.

Such suspension devices for driver's cabins have a complex design, particularly with increased requirements on supporting transverse forces or kinematics, for example the suppression of pitching and rolling and sideways control. Thus, along with the actual spring and absorber elements similar to axle suspensions of motor vehicles, roll stabilizers in particular must be provided, with which the undesired, lateral roll of the driver's cabin relative to the chassis of the vehicle can be reduced.

With suspension devices for driver's cabins, according to the prior art, for example in the case of travel on inclines or in curves, but also for example in the case of road surface unevennesses on one side, roll stabilizers, in the form of torsion rods or stabilizer hollow shafts, are provided for roll stabilization, whereby the spring compression travel of the left and right suspension elements of the driver's cabin, relative to the direction of travel, are coupled together to a certain degree.

In order to introduce the forces, torques and motions of the vehicle cabin into the roll stabilizer, and for the purpose of the guidance of the vehicle cabin in the longitudinal and transverse direction, generally torque levers or torsion limbs are attached to both axial ends of the roll stabilizer, whose end located away from the stabilizer is connected to the vehicle cabin by means of a bearing, while the end of the torque lever near the stabilizer is connected to the roll stabilizer. The bearing of the torque levers, that is rigidly connected to the chassis, is represented here either by the stabilizer itself, or an additional bearing point is disposed at the end of the torque levers that close to the stabilizer, which serves for the movable connection of the torque levers to the chassis, and for introducing the reaction forces, occurring during rolling motions, into the chassis.

Conventional connection devices, particularly between roll stabilizers and torque levers assigned to them, are exposed to very high stresses during their service life. This is especially true when, for example, for reasons of weight reduction with simultaneous increase of the torsional rigidity, torque rods or stabilizer shafts for roll stabilizers are designed in the form of comparatively thin-walled torsion tubes or hollow shafts.

It is known from the prior art to weld or to press connect, for example, the torque levers to the torsion tubes for the torque transmitting connections of such torsion tubes or hollow shafts to corresponding connection components, such as torque levers. In both cases, however, a connection produced in this manner, between the torque lever and the torsion tube, represents a highly stressed potential weak point.

With a welded connection between the torque lever and the torsion tube, this is linked above all to the heat introduced during welding and with the associated microstructural changes, as well as to the unavoidable occurrence of notch stresses. Pure press connections, between the torsion tubes and torque levers, can be established by comparatively gentle cold forming; however, they often fail to attain the necessary service life in the case of the strong forces and high torques that occur. This is also true when, for the purpose of increasing the torque that can be transmitted, a cross sectional shape differing from the circular shape is selected for the hollow shaft in the area of the connection to the connection component.

In particular, with the use of comparatively thin-walled torsion tubes for weight reasons, this is linked to the fact that the tube wall can transmit only limited pressing and shearing forces into the torsion tube in the area in which the force is introduced. For this reason, interference fits, for example, between the hollow shaft and the connection component cannot be implemented with the fixed press fit necessary for transmitting high torques. When the comparatively weak specific forces that can be transmitted are exceeded, the tube wall will therefore separate in the area of the press fit of the torque lever, or the tube wall can be pressed in, which leads to the subsequent failure of the tube cross section.

For overcoming this problem, the document DE 10 2005 056 878 B4 proposed to forgo a weld connection, between the hollow shaft and the torque lever, and to avoid the disadvantage of a press connection, in that after producing the press connection, between the hollow shaft and the torque lever, a plug is driven into the area of the press connection which supports the relatively thin-walled tube in this area, and thus is intended to guarantee the permanent, reliable transmission of high torques.

Despite this proposed improvement, the possibility disclosed in this publication for connecting hollow shafts to connection components is limited to specific intended uses, or requires possibly a series of additional component assemblies or parts for implementing further functions, such as are necessary, particularly however not exclusively, in the case of roll stabilizers for driver's cabs. Among these functions, or objectives, are particularly providing pivot points and bearing points for the bearing blocks disposed on the driver's cab and on the chassis, or for further component assemblies, for instance, for spring/absorber elements for suspension of the driver's cab.

The field of application of customary connection devices also extends further to roll stabilization and axle guidance in vehicle axles, particularly utility vehicles. For roll stabilization of vehicles axles, anti-roll stabilizers, consisting mainly of solid material and bent from one-piece, are used in the prior art, which have a corresponding high mass, especially in heavy utility vehicles, and whose degree of material utilization is extremely unfavorable with respect to the intended twisting and torsional rigidity. The replacement of the massive anti-roll stabilizers by bulky, comparatively thin-walled and thus lighter weight hollow shafts has to date often been unsuccessful because of the problematic connection techniques between such hollow shafts and the torque transmitting connection components, such as torque levers. Further, with such anti-roll stabilizers for vehicle axles, it is also desired to confer, along with the actual function of roll stabilization, further functionalities or axle guiding tasks to the stabilizer, in order to obtain constructively simpler, more robust axle suspensions with lower mass.

SUMMARY OF THE INVENTION

Proceeding from this background, the problem addressed by the present invention is to create a connection device for a torque transmitting connection between hollow shafts and their connection components which overcomes the named disadvantages. The connection device should make it possible to transmit high torques without damage between especially thin-walled hollow shafts and the respective connection components, while simultaneously guaranteeing a high degree of safety against failure. In addition, it should be possible to produce and assemble the connection between the hollow shaft and the connection component cost-effectively and reliably, and using the connection device, it should be possible to implement further constructive objectives, in particular bearing functions, in a simple manner.

The connection device, according to the invention, serves in the known manner for the torque transmitting connection of a connection component, for example, a torque lever or a hub to a hollow shaft. The connection component comprises a penetrating recess, corresponding in shape to the outside cross section of the hollow shaft, for receiving one end of the hollow shaft. Further, also in the known manner, the hollow shaft comprises a press-fit plug in the connection area of the hollow shaft and the connection component. The press-fit plug forms an interference fit, at least sectionally, with the inner cross section of the hollow shaft.

For a start, this already results in a permanent and highly stressable connection between the hollow shaft and the connection component, and comparatively thin-walled hollow shafts can be connected to corresponding connection components, such as hubs or torque levers, without the danger of the failure of the press fit and/or tube wall, in the area of the connection device, in the case of high loading of the connection device. This is due to the fact that the press-fit plug supports the tube wall of the hollow shaft, in the area of the connection device, and presses it against the inner surface of the recess of the connection component such that surface compression or interference fit results not only between the press-fit plug and the tube wall, but also between the outer surface of the hollow shaft and the inner surface of the recess of the connection component.

According to the invention, however, the connection device is characterized in that the press-fit plug is designed simultaneously as a bearing seat for at least one bearing assigned to the hollow shaft. This is advantageous in that, in this manner, the press-fit plug has a dual function, in that functions implemented constructively separately until now, such as the bearing of the hollow shaft, can now be constructively combined with the connection function of the press-fit plug.

Among the advantages arising from this are, first of all, the weight savings and the constructive simplification that can be attained, the omission of additional connections, the advantage of a particularly compact construction having fewer separate components, the thereby attainable improvements in reliability, and the corresponding reduction in costs.

Because the at least one bearing seat assigned to the hollow shaft can now, as a benefit of the invention, be designed integrally with the press-fit plug, it is no longer necessary to locate this bearing, as in the prior art, on the connection component to be connected to the hollow shaft, for instance on a torque lever of a roll stabilizer.

This results not only in the already mentioned constructive simplifications and the advantages associated therewith, but also allows additional cost-saving modifications of the torque lever itself. Because the bearing pins or bearing seats previously required on the torque lever, for suspending and bearing of the stabilizer for example, can thus be omitted due to the invention, the loading forces acting on the torque lever, and the stability requirements for the torque lever are reduced. Thereby it is possible that it is no longer necessary to implement the torque lever as a tempered forged part, for example, rather it can be implemented as an untempered part or also as a cost-effective cast part, and as a further consequence costs can be saved.

The press-fit plug advantageously directly forms a bearing pin for a bearing bushing of the at least one bearing assigned to the hollow shaft. A particularly compact and robust bearing can be implemented in this manner.

According to a particularly preferred embodiment of the invention, bearing bushings of more than one bearing are disposed on the press-fit plug, or can be disposed there. In this manner, the possibility arises to further combine additional functions constructively on the press-fit plugs, whereby particularly further construction space, further mass and additional costs can be saved. Thus, here too, a suspension or bearing arrangement can be attained with less expenditure and higher overall stiffness.

As a start, the invention can be implemented independently of the type of hollow shaft and connection component to be disposed on it, because the connection device, according to the invention, is fundamentally suited for any connection of a hub-like component to the end of a hollow shaft.

According to a preferred embodiment of the invention, the hollow shaft is formed, however, as a torsion bar or a torsion spring, wherein the connection component forms a torsion limb of the torsion spring, and wherein the at least one bearing, disposed on the press-fit plug, forms a bearing point of the torsion spring. With a torsion spring, a constructively advantageous dual function of the press-fit plug, connecting the torsion bar and the torsion limb, is attained in this manner, insofar as the press-fit plug serves this way both as a fastening means for the torsion limb on the torsion bar, and also as a bearing point for suspending or bearing the torsion bar.

The invention is implemented independently of the specific intended use of the connection device according to the invention because the connection device can be used fundamentally with the most varied types of shaft—hub connections. According to a further preferred embodiment of the invention, however, the hollow shaft forms a roll stabilizer of a driver's cab of a utility vehicle, for example, a heavy-duty truck. In this case, the connection component forms a control arm for guiding the driver's cab, wherein the at least one bearing disposed on the press-fit plug can be disposed in a bearing block connected to the vehicle chassis or to the driver's cab. In comparison to the known solutions for connecting and suspending a driver's cab stabilizer, a significantly simplified construction results particularly in that one of the two bearings, previously required separately, and each disposed on the radius arm for connecting the roll stabilizer to the chassis or driver's cab can be omitted, and instead can be disposed simply on the correspondingly elongated press-fit plug of the connection device, according to the invention.

In other words, a threefold function of the press-plug is attained through this, in that it serves as a fastening means for the radius arm of the stabilizer body, as a bearing point for suspending the stabilizer, as well as connecting the stabilizer to the chassis or driver's cab. In this manner, the desired functional consolidation of the roll stabilizer itself can be attained in that the roll stabilizer combines the function of a trailing rod for the driver's cab, that of a transverse link, as well as the stabilizer function, in a constructively particularly simple and robust manner.

According to an alternative embodiment of the invention, the hollow shaft is a roll stabilizer for a vehicle axle. Here, the connection component of the connection device is a control arm for connecting to the axle or for guiding the axle, and the at least one bearing disposed on the press fit plug represents the bearing point of the bearing block connected to the vehicle chassis or to the axle.

With this embodiment of the invention too, the advantageous three-fold function of the press-fit plug results, insofar as the press-fit plug serves here as the fastening means for the torque lever or radius arm on the roll stabilizer, as the bearing point for suspending the stabilizer, and additionally as the connection means between the stabilizer and the axle or chassis.

This embodiment has the additional advantage that a roll stabilizer of a motor vehicle axle connection can in this manner—particularly in the case of heavy-duty trucks—additionally take on demanding control arm or wheel guiding tasks, whereby alternatively required component assemblies, corresponding construction space and weight, and the costs associated with them can be saved.

According to a further preferred embodiment of the invention, the bearing bushing of a bearing for a spring/absorber element is disposed on the press-fit plug. This bearing bushing can be present either alternatively or additionally to the bearing of the hollow shaft disposed on the press-fit plug.

In this manner, the press-fit plug can now receive a fourfold function, namely, in that the press-fit plug provides the function of the connection means of a control arm or torsion limb to a hollow shaft, the function of a bearing point for the hollow shaft, the function of connecting the hollow shaft to a connection component (for example, chassis, axle or driver's cab), and additionally the function of a point of support for a spring/absorbing suspension (for example, for an axle or a driver's cab).

In other words, an extremely compact assembly is created due to the invention particularly for stabilizers or stabilizer links (—combination of stabilizer and radius arm, for example, for an axle or a driver's cab), with which construction space, mass and costs can be saved, wherein the constructive properties such as stiffness, durability and simple assembly in comparison to the prior art, can also be improved at the same time.

For implementing the invention, initially, the cross sectional shape of the outer circumference of the hollow shaft and the recess of the connection component in the connection area to the connection component, is not important. Rather, the press-fit plug, according to the invention, can in principle be profitably used already with hollow shafts having circular outer cross sections in the connection area.

According to a preferred embodiment of the invention, however, the hollow shaft and also the connection component and the press-fit plug have—at least in the connection area to the connection component—a cross sectional shape that differs from the circular shape. In this manner, the torque that can be transmitted between the hollow shaft and the connection component can be significantly increased because hereby, in addition to the frictional connection due to the force fit and due to the press-fit plug, the form fit is added based on the connection cross section differing from the circular shape.

The increase of the torque that can be transmitted initially arises here independently from a concrete cross sectional shape of the hollow shaft differing from the circular shaped and of the press-plug and the recess of the connection component. Thus, it is conceivable, for example, to implement the hollow shaft (in the connection area), the press-fit plug and the connection recess having an oval or elliptical cross sectional shape whereby in particular only a minimal additional notch effect occurs. A significantly more favorable course of the operating stress can—as the applicant has discovered—arise in this manner, depending on the application and implementation, than is the case with the circular cross sectional shape of the connection area.

According to a further preferred embodiment of the invention, however, the hollow shaft and the recess of the connection component have an essentially polygonal cross section. As a result, a particular deep form fit is attained between the hollow shaft and the connection component, and permits particularly high torques to be transmitted.

Preferably the polygonal outer cross sectional shape of the hollow shaft and corresponding to this the shape of the inner cross section of the recess of the connection component—as well as the outer circumference of the press-fit plug—have a continuous finite curvature. In other words, this means that the cross sectional shape of the hollow shaft, the connection component and the press-fit plug, in each case, do not have any sharp corners, rather the edges of the polygonal cross sectional shapes are rounded. In this manner, the notch effect occurring in the material in the area of the polygonal edges is significantly reduced, and the torque that can be transmitted long-term without damage, can be increased.

According to a further preferred embodiment of the invention, the cross sectional shape of the hollow shaft and the connection component is designed in the connection area as a curve with constant width. The curve with constant width represents a closed line as a cross sectional shape, which—similar to a circle inscribed in a square—in each angular position within a suitable square always contacts all four sides of the square. The curve with constant width as a cross sectional shape of hollow shaft and connection component in the connection area represents a particularly effective compromise between the polygon having optimal form fit, but high notch effect, and the circular cross section without form fit and without notch effect.

According to a further preferred embodiment of the invention, the press-fit plug and the recess of the connection component, in the area of the hollow shaft and the connection component, are designed slightly conical tapered in the shaft axial direction. In this manner, when the press-fit plug is pressed in, higher and more uniform surface pressures result between press-fit plug, the hollow shaft and the recess of the connection component. With this, also higher torques can be reliably transmitted and, in addition, a higher compressive strength of the connection component results in the axial direction, because the press-fit plug expands the end of the hollow shaft that was formerly prismatic during pressing in, and thereby presses it against the conically tapering interior contour of the connection component. Also due to this embodiment, the fit between the recess of the connection component and the outer cross section of the press-fit plug, among others, possibly does not need to be manufactured as precisely.

According to a further preferred embodiment of the invention, the press-fit plug is hollow or has a recess in the axial direction. This leads to a weight savings with press-fit plug and permits an improvement of the progression of the characteristic force lines, in the area of the press connection, due to the then lower changes in wall thickness at the location of the entrance of the hollow shaft into the press connection.

The invention can be implemented initially independently of the specific material selection for the press-fit plug. Preferably, however, the press-fit plug is manufactured from a ferrous material (steel, for example) or from a non-ferrous metal (aluminum, for example). A press-fit plug composed of steel is cost-effective while, at the same time, offering high strength and permitting the creation of higher surface pressures. A press-fit plug composed of aluminum is particularly advantageous with respect to its low weight and the high ductility of aluminum. The latter also contributes to the reduction of the damaging edge pressures and the associated undesired notch effect, which otherwise can occur, particularly in the area of the entrance of the hollow shaft into the press connection.

According to a further preferred embodiment of the invention, the press-fit plug has a tip or a circumferential chamfer at its end facing the hollow shaft. A press-fit plug shaped in this manner facilitates easier insertion and assembly, and furthermore tilting and a possible chip formation, damage, or a peeling of material in the area of the inner surface of the hollow shaft during pressing the press-fit plug into the opening are avoided.

In a further preferred embodiment of the invention, the cross section shape of the hollow shaft differs from the circular shape essentially only in the connection area of the hollow shaft to the connection component. This means, in other words, that the hollow shaft can have a particularly circular cross section outside of the area of connection area to the connection component. As a result, there are cost savings with the production of the hollow shaft because the hollow shaft, according to this embodiment, has a cross section differing from a circular shape only at its two ends.

BRIEF DESCRIPTION OF THE DRAWINGS

The invention is explained below in greater detail with reference to drawings that merely depict examples of embodiments. They show:

FIG. 3 a roll stabilizer for a driver's cabin having a connection device according to one embodiment of the invention, in a representation and view corresponding to FIG. 1;

FIG. 4 a press-fit plug of the connection device, according to FIG. 3, in a view and representation corresponding to FIG. 2;

FIG. 5 a longitudinal section through the connection device, of the prior art, according to FIG. 1, in a schematic representation;

FIG. 6 a longitudinal section through a connection device, according to one embodiment of the invention, in a representation and view corresponding to FIG. 5; and FIG. 7 a longitudinal section through a connection device, according to the invention according, to FIG. 2, in a representation and view corresponding to FIGS. 5 and 6.

DETAILED DESCRIPTION OF THE PREFERRED EMBODIMENTS

Figure 1:
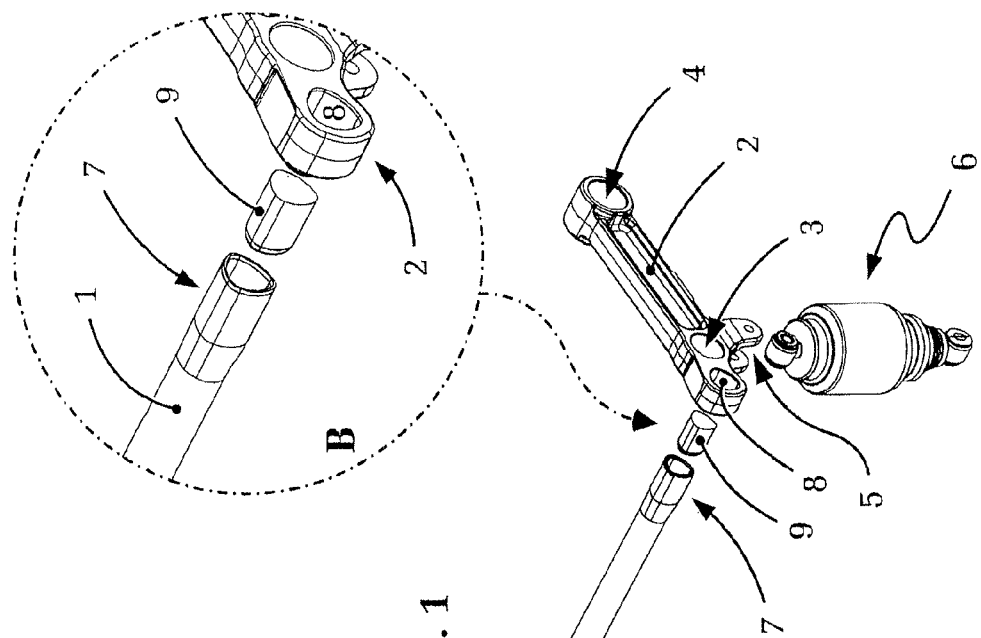
FIG. 1 an isometric representation of a roll stabilizer, for a driver's cabin, having a press-fit plug connection device according to the prior art.

FIG. 1 shows a roll stabilizer for a driver's cabin, according the prior art, wherein the represented roll stabilizer has a press-fit plug connection device on each of the two ends. First, the hollow shaft 1 can be seen acting as a torsion element having a torque lever 2 disposed on both ends. To begin with, each of the two torque levers 2 supports two bearing points 3 and 4 provided with elastomer bearings, wherein the bearing point 3 near the shaft serves, in each case, for connecting the roll stabilizer to a driver's cab (not shown) and the bearing point 4, away from the shaft, serves for connecting to the vehicle chassis (also not shown).

The function of the bearing point pairs 3, 4 of each of the two torque levers 2—while maintaining the functionality of the roll stabilizer—however, also can be switched, which means that the bearing points 3 near the shaft are hinged to the chassis, and the bearing points 4 spaced from the shaft, in contrast, is hinged to the driver's cab.

Further, a spring/absorber unit 6 is disposed at a further bearing point 5, of each of the two torque levers 2, that serves in the case of the represented embodiment for the resilient and damping suspension of the driver's cabin with respect to the vehicle chassis.

As can further be seen in FIG. 1, in particular based on the enlarged detail representation "B", that the hollow shaft 1, which has a circular cross section in its middle region, is widened in the areas of its ends 7 into a cross sectional shape substantially matching a curve with constant width, wherein the cross sectional shape of the curve with constant width, in the represented embodiment, is derived from an isosceles triangle. The torque levers 2 have a recess 8 matching the outer cross section 7 of the hollow shaft 1 in the area 7 of its ends, thus, matching the cross section of the curve with constant width 7.

For assembly of such a roll stabilizer, first, the two torque levers 2 are placed on or pressed onto the ends 7 of the hollow shaft 1, which were previously widened to a curve of constant width. Next, the two end side openings of the hollow shaft 1 are each closed by a press-fit plug 9 whose circumferential shape is also matched to the curve of constant width fitting the cross sectional shape of the hollow shaft 1 and the recess 8 of the torque lever 2. The dimensions of the outer circumference of the press-fit plug 9 are selected so that there is an interference fit between the recess 8 of the torque lever 2, the wall 7 of the hollow shaft 1 disposed therein and the press-fit plug 9 disposed in the hollow shaft 1.

Figure 2:
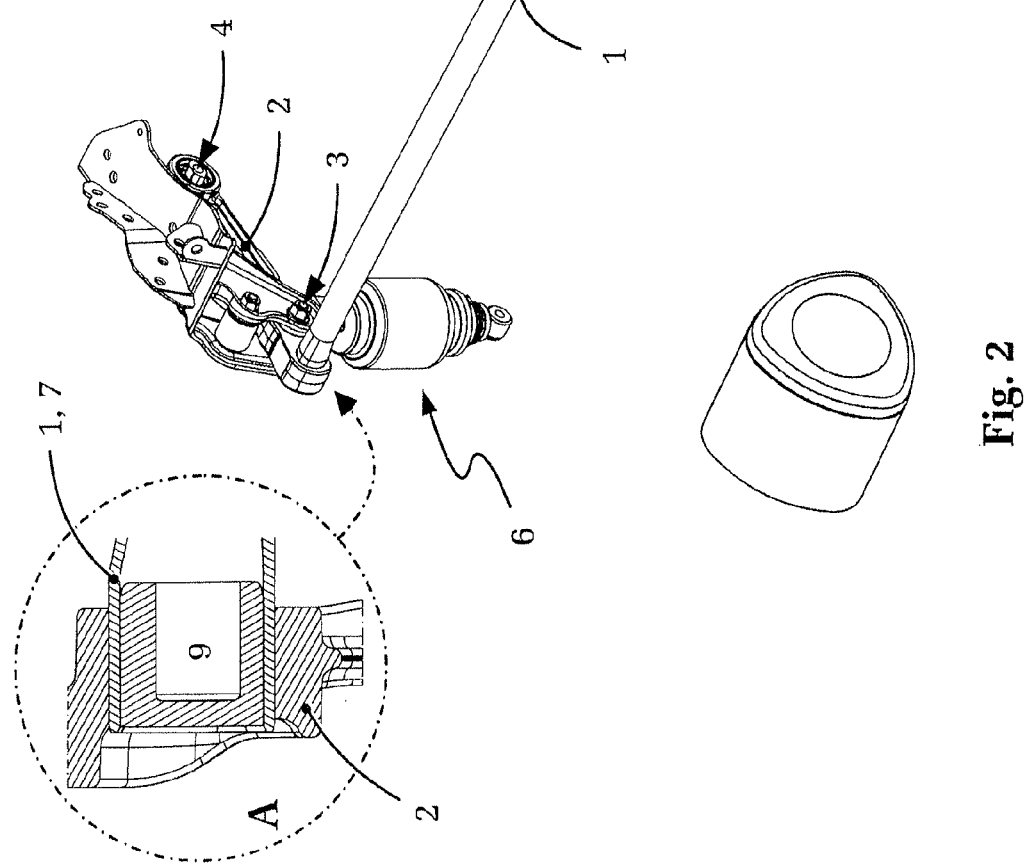
FIG. 2 a press-fit plug of the connection device according to FIG. 1, in an isometric view.

In FIG. 2, the press-fit plug 9 is again shown enlarged in the detailed view "A" (together with an end of the hollow shaft 1 and a part of the torque lever 2).

It can be seen in FIG. 1 that the shape of the torque lever 2 and its connection to the chassis or driver's cab—particularly by means of the bearing point 3 close to the shaft—is complex and requires numerous individual parts. The construction, according to FIG. 1, known from the prior art, tends to be assembly, weight and cost intensive, because it requires numerous different connection points and connecting elements with significant construction space requirements. Also, the connection between the torque levers 2 and the driver's cab by means of the bearing points 3, and with respect to spring/absorber elements and therefore the connection to the vehicle chassis by means of the additional bearing points 5 is not only complex, but can also lead to undesired elasticities in the assembly. In addition, due to the arrangement of the bearing points 3 and 5 on the torque lever 2, and the resulting loading, it is frequently necessary to implement the torque levers 2 as expensive, tempered forged parts, because of the direct force application.

In contrast, FIG. 3 shows, in a view initially corresponding to FIG. 1, a roll stabilizer for a vehicle cabin having a connection device, designed according to the invention, between the torque lever 2 and the hollow shaft 1. It can be seen that in this connection device, according to the invention, the press-fit plug 9—in addition to the task of the connection between torque lever 2 and hollow shaft 1—also combines the tasks of bearing and coupling the represented roll stabilizer to the driver's cab (not shown), and to the spring/absorber elements 6, and thus to the vehicle chassis.

In other words, with the invention, the bearing points 3 and 5 that are still separate and complex with the prior art—for connecting the roll stabilizer to the driver's cab and spring/absorber elements (see FIG. 1)—are now positioned coaxially with the hollow shaft 1 of the roll stabilizer, and disposed together on the press-fit plug 9—provided with corresponding bearing seats 10, 11.

As can be seen in particular in the bearing arrangement in an unexploded representation on the left, with respect to the drawing, this leads to an extremely compact and constructively simplified and plain design of the connection of the roll stabilizer to the driver's cab and chassis. As a result, the overall number of complex individual components is reduced by a considerable degree, as are the construction space, mass and assembly costs. At the same time, a particularly reliable and rigid connection of the individual component assemblies and bearings, on the end of the hollow shaft 1 of the roll stabilizer, is attained.

In addition, the torque lever 2 can be constructively simplified, to a significant extent, due to the invention because the connections, previously required on the torque levers 2 for the bearing points 3 and 5 (see FIG. 1), can be completely omitted, or can be replaced by the bearing seats 10, 11 disposed on the press-fit plug 9. Therefore, according to FIG. 3, with the connection device according to the invention, the torque levers 2 also have the tendency to be loaded less than with the connection device known from the prior art, according to FIG. 1, and can therefore be produced by a less complex manufacturing method, for example, as a cast part instead of a forged part, or with the elimination of a tempering step possibly necessary for the production of the torque levers 2 of the prior art.

The form of the press-fit plug 9, selected with the embodiment of the invention according to FIG. 3, is particularly visible from a synopsis of the detailed views "C" and "D" having the enlarged representation of the press-fit plug according to FIG. 4. In addition, it can be seen in FIG. 4 that the press-fit plug, on its end facing the hollow shaft, has an circumferential chamfer 12 to facilitate, in this manner, pressing the press-fit plug into the end of the hollow shaft. For the same purpose of facilitating the pressing, the inner circumference of the associated end, at 7 of the hollow shaft, can additionally also be provided with a chamfer.

The press-fit plug 9, in the embodiment of the invention according to FIG. 3, has two integrally formed, stepped bearing seats 10, 11. As seen particularly in detailed representation "C" of FIG. 3, for the purpose of assembly of the roll stabilizer in the vehicle, a bearing bushing 13, 14 can be disposed on each of the two bearing seats 10, 11. In the embodiment shown, the bearing bushing 13, assigned to the first, larger of the two bearing seats 10, is part of a slide bearing which is disposed in a bearing block 15 and is connected to the driver's cab by means of the bearing block 15. This first bearing 10, 13 serves a dual function, in that it simultaneously forms the rotatable bearing of the roll stabilizer, and the force transmitting connection of the roll stabilizer to the driver's cab.

The bearing bushing 14, assigned to the second, smaller of the two bearing seats 11 of the press-fit plug 9, is part of an elastomer bearing. The spring/absorbing suspension of the driver's cab to the chassis occurs—indirectly using the first bearing 13 and the bearing block 15—by means of the elastomer bearing and the spring/absorber element 6 engaging there.

In this embodiment, the further bearing point 4, at the other end of the torque lever, is also connected to the vehicle chassis using an elastomer bearing.

An additional advantage of using the press-fit plug 9 is that in addition—due to the local reinforcing of the hollow shaft 1 by the pressed in press-fit plug 9—the maximum bending stresses occurring due to the bending torques acting on the hollow shaft 1 are shifted into the less strongly loaded center area of the hollow shaft 1. As a result of this, the fatigue strength of the connection device, according to the invention, and of the entire roll stabilizer is further improved.

As seen in particularly in detail representation "C" of FIG. 3, the press-fit plug 9 here has a central recess. Due to the partially hollow implementation of press-fit plug 9, the progression of the characteristic force line in the area of the connection between press-fit plug 9, hollow shaft 1 and torque lever 2 is improved, the changes in stiffness occurring there are reduced, and furthermore mass is saved. It can also be seen clearly from detail representation "C" that the thin wall of the hollow shaft 1, 7, considered weak on its own, is completely form-locking enclosed here between the recess 3 of the torque lever 2 and the press-fit plug 9. In this manner, a reliable torque transmission results despite the cross section of the recess 3, hollow shaft end 7 and press-fit plug 9 designed here—in this embodiment—as a curve of constant width with a comparatively large radii of curvature, whereby this cross sectional shape contributes also to a particularly uniform force flow.

FIGS. 5, 6, 7 show the connection between one end 7 of the hollow shaft 1 and a torque lever 2 with the prior art (FIG. 5), and again comparatively with different embodiments of the invention (FIGS. 6 and 7). Here, FIG. 5 corresponds to detail representation "A" with the roll stabilizer, according to the prior art from FIG. 1; FIG. 7 corresponds to detail representation "C" with the roll stabilizer, according to the invention according to FIG. 3; while FIG. 6 shows a further embodiment of a roll stabilizer having a connection device, according to the invention.

The further embodiment, according to FIG. 6, differs from the embodiment described above according to FIGS. 3, 4, and 7 primarily in that the press-fit plug 9, in the embodiment according to FIG. 6, does not have two additional bearing seats as in FIG. 7, but only one additional bearing seat 10, which supports the bearing of a bearing block 15 that can be connected to the chassis or to the driver's cab.

Particularly based on the comparison of FIGS. 5 and 7, the robust and compact combination of extensive bearing functions, on the press-fit plug made possible by the invention, is again evident.

As a result, it is clear that due to the invention, a connection device is created for the torque transmitting connection between hollow shafts and associated connection components which along with the durable ability to transmit high torques also allows the additional connection of further component assemblies, particularly the direct connection of bearing points on the connection between the hollow shaft and the connection component. Due to the combination of functions that is possible with the invention, in comparison to the prior art, a number of complex component assemblies, as well as further construction space and mass, can be saved to a significant degree; at the same time, a reliable and particularly rigid connection of different component assemblies or bearings, at the end of a hollow shaft, is attained. Finally, the connection device, according to the invention, also leads to the anticipation of cost reductions in production and assembly, and lower maintenance requirements during operation.

The invention therefore makes a significant contribution to the further development of the technology of hollow shaft connections, particularly in the field of the intended application with roll stabilizers, particularly for bearings of driver's cabs of utility vehicles, or for axle connections, particularly for trucks.

LIST OF REFERENCE SYMBOLS

1 Hollow shaft, torsion spring
2 Connection component, torque lever, torsion limb
3, 4, 5 Bearing point
6 Spring/absorber element
7 End area, connection area
8 Recess
9 Press-fit plug
10, 11 Bearing seat
12 Chamfer
13, 14 Bearing, bearing bushing
15 Bearing block

The invention claimed is:

1. A connection device for a torque transmitting connection of a connection component (2) to a hollow shaft (1), the connection component (2) comprising:
a penetrating recess (8), corresponding in shape to an outer cross section of the hollow shaft (1), for receiving an end of the hollow shaft (1),
wherein the hollow shaft (1), in a connection area of the hollow shaft (1) and the connection component (2), comprises a press-fit plug (9) which, together with an inner cross section of the hollow shaft (1), has an interference fit at least in sections, and the press-fit plug (9) is a bearing seat (10, 11) for at least one bearing (13, 14) assigned to the hollow shaft.

2. The connection device according to claim 1, wherein the press-fit plug (9) forms a bearing pin (10, 11) for at least one bearing bushing (13, 14) of the at least one bearing.

3. The connection device according to claim 1, wherein a plurality of bearing bushings (13, 14) of a plurality of respective bearings are supported by the press-fit plug (9).

4. The connection device according to claim 1, wherein the hollow shaft (1) is a torsion spring, the connection component forms a torsion limb of the torsion spring and the at least one bearing (13, 14) forms a bearing point of the torsion spring (1).

5. The connection device according to claim 1, wherein the hollow shaft (1) is a roll stabilizer of a truck cab, the connection component (2) is a control arm for guiding the driver's cab, and the at least one bearing (13) is disposed in a bearing block (15) that is connected to one of a vehicle chassis and a vehicle cab.

6. The connection device according to claim 1, wherein the hollow shaft (1) is a roll stabilizer for a vehicle axle, the connection component (2) is a control arm for guiding the axle, and the at least one bearing (13) is disposed in a bearing block (15) that is connected to one of a vehicle chassis and a vehicle axle.

7. The connection device according to claim 1, wherein a bearing bushing (14) of a bearing of a spring/absorber element (6) is disposed on the press-fit plug (9).

8. The connection device according to claim 1, wherein the hollow shaft (1) and the recess (8) of the connection component (2) comprise cross section shapes which differ from a circular shape.

9. The connection device according to claim 8, wherein the connection area (7) of the hollow shaft (1) and the recess (8) of the connection component (2) each have a substantially polygonal cross sectional shape.

10. The connection device according to claim 9, wherein a circumference of the polygonal cross section has a continuously finite curvature.

11. The connection device according to claim 8, wherein the cross sectional shape of the hollow shaft (1) and the connection component (2) in the connection area (7) is designed as a curve with constant width (7).

12. The connection device according to claim 1, wherein the press-fit plug (9) and the recess (8) of the connection component (2) in the connection area (7) of the hollow shaft (1) and the connection component (2) each are slightly conically tapered.

13. The connection device according to claim 1, wherein the press-fit plug (9) is one of hollow and has a recess in the axial direction.

14. The connection device according to claim 1, wherein the press-fit plug (9) is manufactured in a non-cutting manner.

15. The connection device according to claim 1, wherein the press-fit plug, at an end thereof facing the hollow shaft (1), has one of a tip and a circumferential chamfer (12).

16. The connection device according to claim 8, wherein the cross sectional shape of the hollow shaft (1), differing from the circular shape, is substantially present only in the connection area (7) to the connection component (2).

* * * * *